United States Patent [19]
Beltz

[11] 3,965,864
[45] June 29, 1976

[54] AUTOMATIC DEVICE FOR THE MAINTENANCE OF SMALL ANIMALS

[75] Inventor: Heinrich Beltz, Marburg, Lahn, Germany

[73] Assignee: Behringwerke Aktiengesellschaft, Marburg, Lahn, Germany

[22] Filed: Dec. 17, 1974

[21] Appl. No.: 533,655

[30] Foreign Application Priority Data
Dec. 19, 1973 Germany.................. 7344856[U]
Dec. 19, 1973 Germany.......................... 2363024

[52] U.S. Cl................................. 119/18; 119/22; 119/72.5
[51] Int. Cl.² .................. A01K 1/00; A01K 7/00
[58] Field of Search.................. 119/18, 22, 72.5

[56] References Cited
UNITED STATES PATENTS

| | | | |
|---|---|---|---|
| 3,581,713 | 6/1971 | Crooks | 119/72.5 |
| 3,585,968 | 6/1971 | Stone, Jr. | 119/22 |
| 3,658,031 | 4/1972 | Coe | 119/18 |
| 3,776,190 | 12/1973 | Hurlbert | 119/18 |
| 3,785,345 | 1/1974 | Rhinehart et al. | 119/18 |

*Primary Examiner*—Hugh R. Chamblee
*Attorney, Agent, or Firm*—Curtis, Morris & Safford

[57] ABSTRACT

An automatic device for a rational management of animals, in particular of small animals, which essentially consists of a combination of an automatic feeder, a specially shaped watering valve and an automatic dung remover with the adequate cages.

7 Claims, 9 Drawing Figures

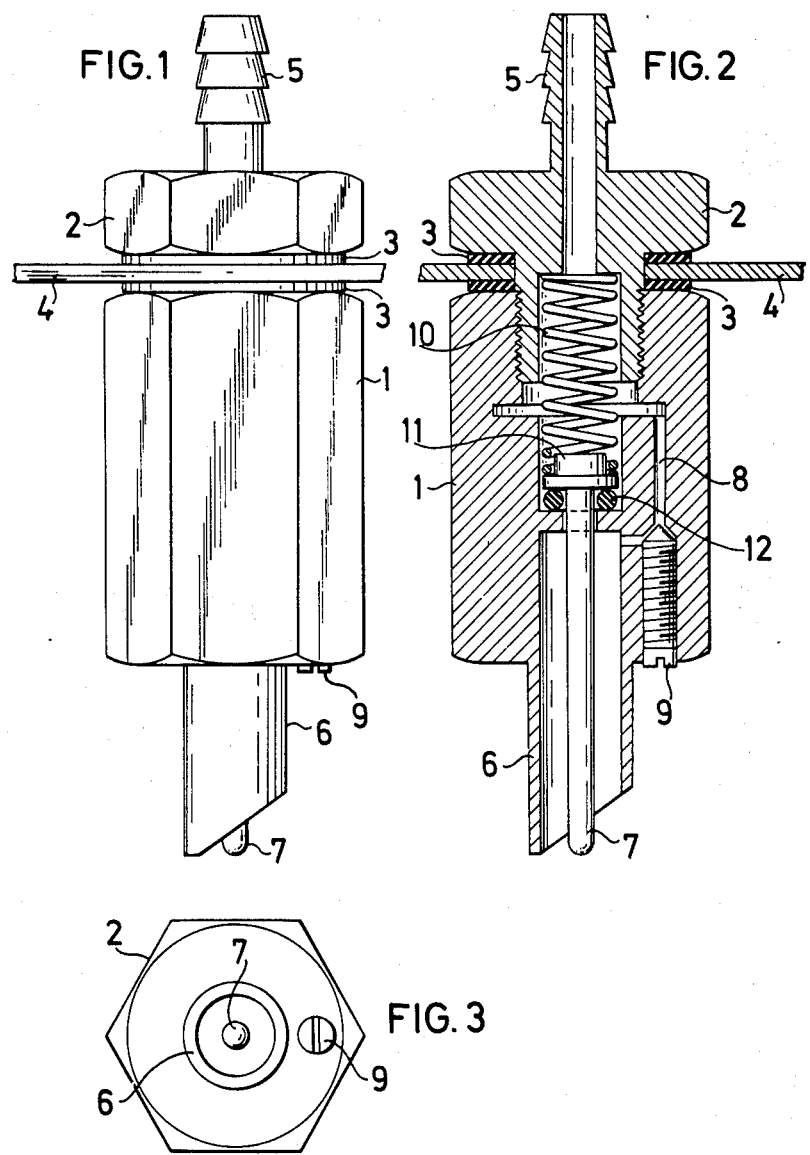

AUTOMATIC DEVICE FOR THE MAINTENANCE OF SMALL ANIMALS

The present invention relates to an automatic device for a rational management of animals, especially small animals, for example rabbits, which combines a device for the supply of fodder and water and an automatic dung cleaning with adequate cages.

It is already known for the fattening of poultry to use automatic feeding devices which transport the fodder to the feeding places by means of conveyor chains or screws running in steel tubes. Another known device ensures automatic water supply to corresponding animal stalls, in which the animals may have their drinking water from specially designed water valves. As to automatic dung removal, it has proved advantageous in some cases to discharge animal excrements by means of paper or plastic belts. In the management of small animals, however, predominant use is being made of cages which do not permit a combination of the abovesaid maintenance systems. For this reason, cages are being equipped nowadays almost exclusively with feeding bowls, water bottles, the corresponding supports thereof and dung or manure trays. Bulk management of small animals is only possible with a large personnel required for maintaining the cages.

A number of difficulties had to be overcome in converting the individual maintenance systems into a combination which ensures a semiautomatic or fully automatic management of the animals. The known fodder tube conveyors which consist of tubes in which a conveying chain or screw transports the fodder to the feeding troughs, could not be used directly for a great number of feeding places as required for cage batteries. It had to be made sure that the same weight of fodder is transported to each cage. Since rodents do not eat the fines resulting from the wear of the fodder during the chain transport, safe means had to be found to remove these fines from the determined amount of fodder. These two requirements are met by a special design of the feeding bowl; its supply pipe projects at a given length into the feeding bowl of a determined size and the bottom of the bowl is provided with slots.

When small animals which do not come from a confined management are kept in cage batteries, it appears that a large part of the animals do not use the automatic watering nipples of the water supply, if these release water only upon contact. Those animals which do not drink water with dry fodder, also refuse to eat after some time and die. To overcome this difficulty, dripping or permanently moist nipples had to be used as watering nipples. This can be achieved, for example by purposefully damaging the sealings of commercial-type watering nipples.

More appropriate, however, is a water-supply valve which consists of a valve body with a pin centered in a water supply pipe. The pin opens the sealing of the valve on contact and releases water; with the contact off, it again shuts the sealing which is provided with a by-pass that can be closed by means of an adjusting screw.

If required, this arrangement allows the conically pointed adjusting screw to be screwed into a conically enlarged portion of the by-pass as far as to completely shut off the water supply from the valve, when this is not used.

For the management of small animals, above all rabbits, it is also possible to screw the adjusting screw into the coneshaped portion of the by-pass to such a point that the water supply is just sufficient to keep the watering nipple moist, thus marking the watering place for the animals. Should this not be enough for some animals, a steady dripping from the watering pipe can also be achieved by means of the adjusting screw. The nipple pin centered in the watering pipe is pressed against an O-shaped sealing by means of a spring, thus preventing the escape of water unless the valve is used.

In a preferred embodiment of this valve, the valve pin is fixedly connected to a spring so as to press against a sealing and stay in a centric position within the watering pipe.

This fixed connection of the spring to the nipple pin ensures that already a slight pressure, exerted by an animal's snout against the pin, displaces the pin from its centric position, thus opening the sealing and allowing water into the watering pipe for the animal to drink. When the pressure is released, this spring arrangement re-sets the nipple pin into its centric position within the watering pipe. This spring arrangement of the invention offers the advantage of sealing the valve, supplying water in a simple manner and re-sealing the valve after use.

The valve arrangement of the invention is illustrated diagrammatically by way of example in the accompanying drawings.

In these drawings,

FIG. 1 is a lateral view of the valve,

FIG. 2 is a longitudinal section through this valve,

FIG. 3 is a view of this valve from below.

Figure 4:
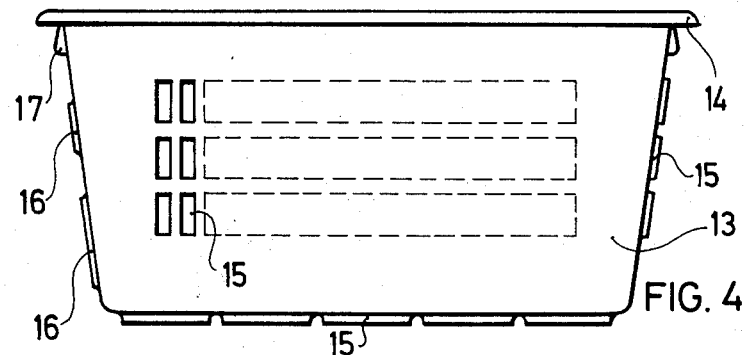

In FIG. 1, a valve body (1) is fixed by means of a screw (2) and shimmed sealing disks (3) in a correspondingly punched support (4). The water supply is advantageously provided for by means of a hose mouthpiece (5). Water enters a pipe (6), whenever, for example, an animal presses its snout against a pin (7), or an adjusting screw (9) is handled so as to allow water to pass through a by-pass.

In FIG. 2, a by-pass (8) having a conically enlarged portion can be sealed by means of a conically pointed adjusting screw (9). This sealing may also be obtained, for example, by an accordingly lateral screw arrangement, that is to say, by turning the screw direction by 90 degrees. The valve pin (7) is pressed by means of a spring (10), which is fixedly connected to the head (11) of pin (7), against an annular sealing (12), in the instant case shaped as an O-ring. The Figure clearly shows that the sealing is opened, whenever the pin is displaced from its centric position, and that the spring shuts the sealing and resets the pin in its centric position.

In FIG. 3, the water supply from the sealed valve can be controlled by an easily accessible adjusting screw (9).

The watering valve is advantageously made of stainless material, preferably of stainless steel or of brass, but also of suitable plastic material. It is advisable to make the watering pipe and the valve pin from materials that cannot be bitten down by the animals. The adjusting screw may be of the same material as the valve body, but as experience has shown, its sealing effect is better if the screw is made of an appropriate plastic material. As circular sealing inside the valve body, commercial-type O-shaped sealings and, as sealing disks, materials suitable for sealing purposes and known to the expert are used.

The cages can generally be cleaned using already known paper-belt dung removing devices. These devices consist of a new paper-belt reel arranged at one side of the device, the paper belt running beneath the cages, the excrement scraper, the operation handwheel and the wind-up reel for the used paper arranged at the other side.

An optimum maintenance of animals is, however, only possible with a cage that allows a combination of all these devices. A cage for keeping small animals as disclosed in German Utility Model No. 7,233,481 is particularly useful.

The cage according to German Utility Model No. 7,233,481 has the form of a rectangular box which is open at the top and has a flanged upper edge for the cage to be suspended by pushing it into two grooves worked into an appropriate, fixedly installed cover plate. At least part of the cage's bottom and walls are perforated to ensure the necessary ventilation and to allow the animal's excrements to fall through and be removed by means of a suitable device, for example a conveyor belt.

The cage consists of a thermoplastic material, advantageously a polyolefin, such as polyethylene or polypropylene, and may, for example, be produced by injection-molding or deep drawing methods. The material and the production method permit the making of a cage without sharp edges or parts projecting into the interior, so that injuries to the animals or damage to the material by biting are excluded.

In a preferred embodiment of the cage, only the front wall and one side wall are provided with ventilation slots to avoid formation of draught which would occur - and damage the animals- if opposite walls were perforated. Such a cage, moreover, has the advantage that animals kept in neighboring cages cannot see each other.

Moreover, the cage has a back wall with apertures, in which appropriate supply equipment for fodder and drinking water can be fitted, when the cage is suspended.

In order to permit stacking up of the cages when not in use, it is suitable to make the lateral walls slightly inclined to the outside in upward direction. Moreover, immediately below the flanged upper edge, the lateral walls may have noses which rest on the upper edge of the cage beneath, when the cages are stacked up. This keeps the stacked cages at a certain distance from each other and, especially when the cages have been washed, air can more easily pass between and dry them.

Figure 5:
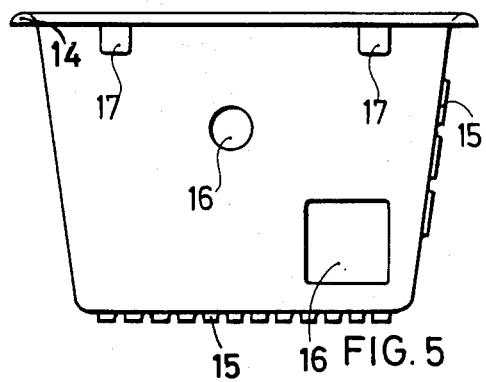
Figure 6:
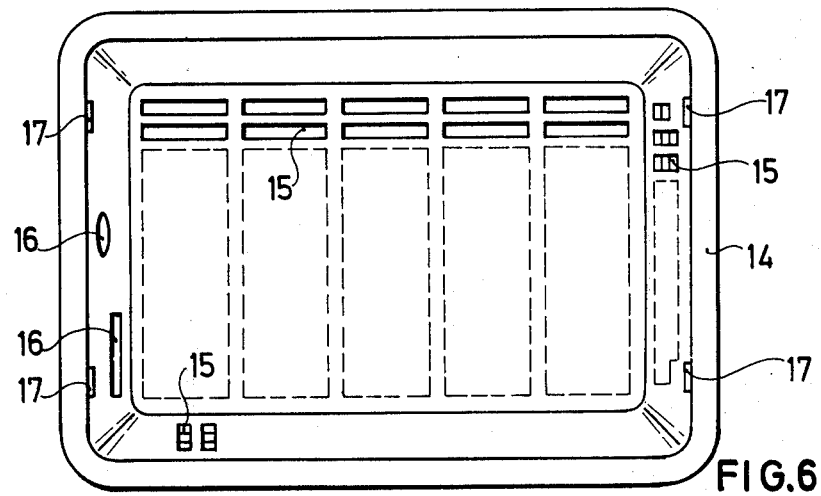

FIGS. 4 to 6 illustrate a preferred embodiment of such a cage.

FIG. 4 is a lateral view of the cage,

FIG. 5 is a view of the front side of this cage and

FIG. 6 is a top view of the cage.

In these Figures, the reference numbers have the following meanings:

13. body of the cage made of thermoplastic material,
14. flanged upper edge,
15. apertures in the lateral wall and the bottom of the cage for the ventilation and discharge of excrements,
16. apertures for the supply of fodder and drinking water,
17. noses shaped into the front walls for facilitating the stacking of the cages.

In the present combination, the device for the supply of drinking water and fodder is connected up to one line, so that a cage having these essential features can be, without disturbing the whole arrangement, withdrawn for treating the animals or cleaning or disinfecting the cage. Even if several cages are out of function, this does not affect the arrangement as a whole. Part of the cage's bottom is perforated to allow the excrements of the animals to be carried away by means of a conveyor belt running underneath the cage. The dripping nipples for the water supply can be adjusted so as to dilute the animal urine steadily on the dung conveyor belt and thus to wash it away to a large extent, without the conveyor belt having to be operated continuously. This dilution of the animal urine greatly reduces the unpleasant odor.

The combination of the above-said elements allowed an animal management to be created as a functional maintenance unit. If a dripping water nipple is used, a dung transporting belt has to be used instead of dung trays, since these would soon overflow. On the other hand, if a dung tray were removed for cleaning, a dripping water nipple would drop water into the cage beneath, and so would the fodder fines. If, however, the drinking water were supplied from water bottles instead of water nipples, the disadvantage would be that the animals have to take fodder and water at two different sides of the cage, provided the above-said fodder transport device is used.

The advantage of the device according to the invention is the possibility of automating the maintenance of small animals to a large extent. Whenever required, fodder can be supplied from a silo by simply switching on a transport motor either by hand or by means of a time switch. The controlled supply of fodder permits fattening of the animals or, where required, normal feeding. The drinking water supply is made continuous and the dung removal may be made continuous or discontinuous as required.

Cage batteries containing some hundreds of cages can be supervised by one person.

For example, batteries of 400 cages each, stacked in four tiers, have proved to be a particularly rational arrangement for the maintenance of rabbits.

The present arrangement is especially suitable for the management of small animals for production and test purposes. It permits the maintenance of small animals of all kinds, in particular of rabbits and guinea pigs. A corresponding modification in the cage design makes this device also suitable for rodents, such as rats, mice and gold hamsters, but also for cats and monkeys, birds and poultry, unless the fodder appropriate for those animals is unfit for transport by tube conveyor.

Figure 7:
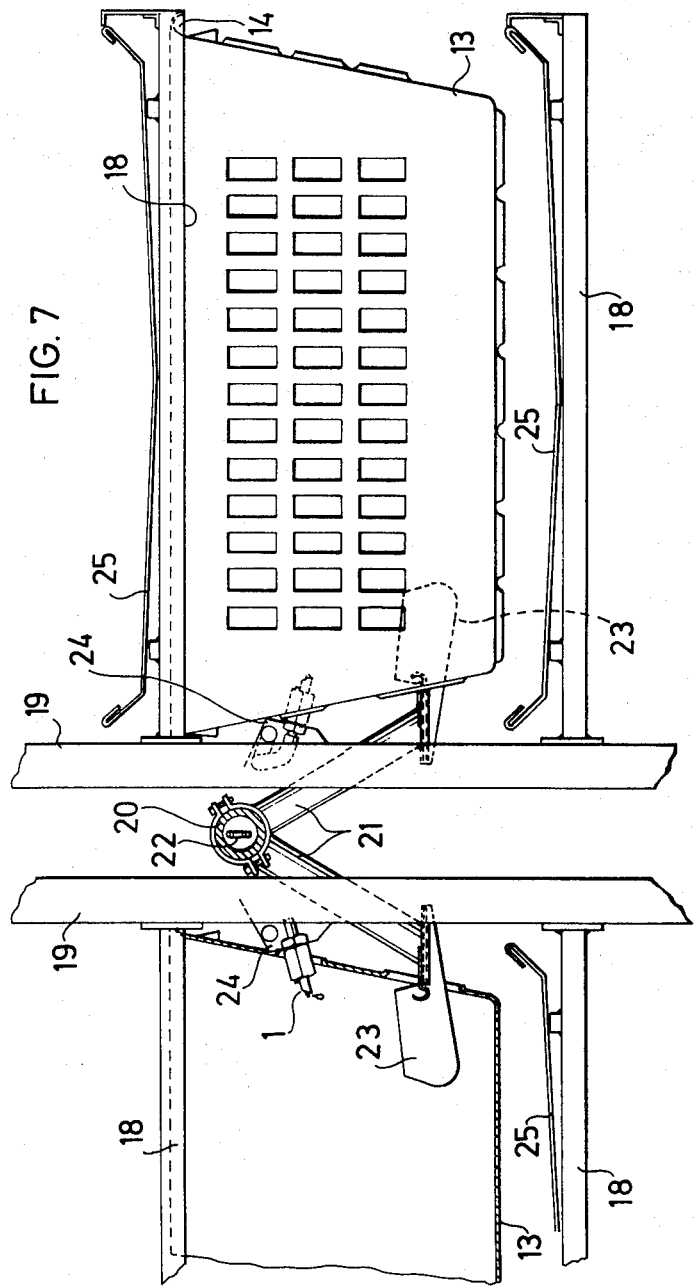

FIG. 7 is a cross-sectional view of one embodiment of the whole arrangement.

Figure 8:
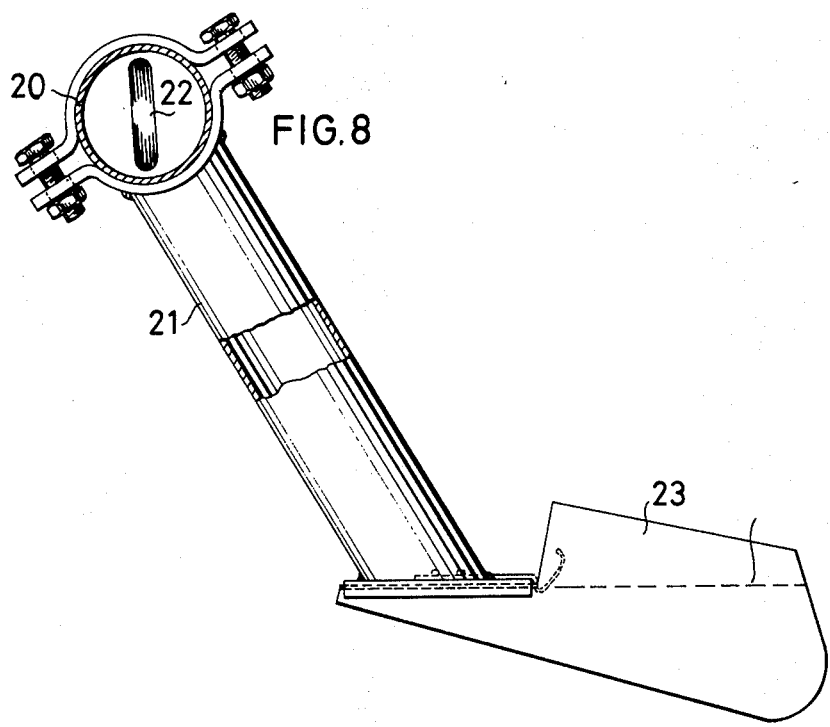

FIG. 8 is a lateral and partly cross-sectional view of the feeding supply with feeding bowl.

Figure 9:
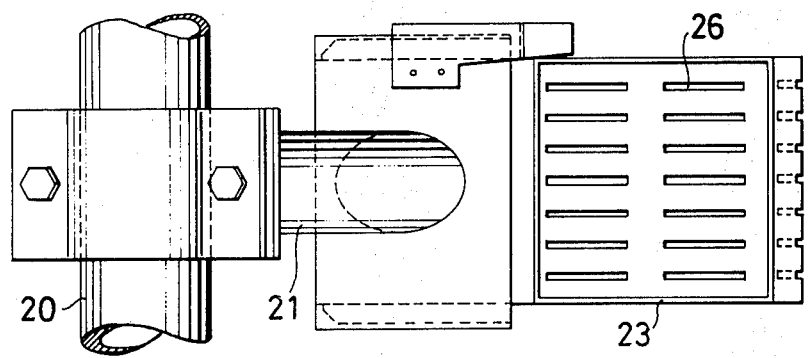

FIG. 9 is a top view of this feeding device.

In FIG. 7, a cage (13) — analogous to that disclosed in German Utility Model No. 7,233,481 — is pushed with its flanged-up edge (14) into grooves of a holding frame (18) of a rack (19) like a drawer. Fodder is supplied by means of a conveying tube (20) provided with two feeding tubes (21), the transport of the fodder in the conveyor tube being effected by means of a transport chain (22).

The feeding tubes (21) end in feeding bowls (23) (see also FIGS. 8 and 9). The watering device consists of a water supply line (24) provided with a water nipple (1). The dung is carried away by means of a dung transport belt (not shown) which moves on a support (25).

In FIG. 8, feeding tube (21) for the fodder and feeding bowl (23) are shown in detail to demonstrate that the length of tube (21), in combination with the feeding bowl, limits the filling height of the fodder.

In FIG. 9, the feeding bowl (23) is provided with slots (26) to allow the fodder fines to fall through.

We claim:

1. An automatic device for rational management of small animals comprising, a frame, at least one pair of separate apertured cages for retaining small animals removably mounted on said frame in adjacent spaced locations, means for supplying drinking water to said cages; means for supplying fodder to said cages including a common fodder supply conveyor mounted in said frame between said cages and having a pair of feed tubes extending therefrom, said feed tubes each including a feeding bowl mounted on the end thereof remote from said conveyor and extending into its associated cage through an aperture in a side wall thereof, and means mounted in said frame for receiving and automatically removing dung falling from said cages; each of said feed bowls having a bottom, side, and top wall and wherein the top wall has an opening therein through which the animals feed, said feed tube being connected to and in communication with the feed bowl through the top wall thereof whereby fodder supplied to said bowl through the tubes rises only to the level of the top wall; the bottom wall of the bowl having thin slots formed therein to allow only fodder fines to pass therethrough; and said water supply means including a water supply valve having an inlet port and an outlet spout formed; and a valve seat formed therein between said inlet port and outlet spout; a valve closure element mounted in said valve upstream from said seat; spring means for biasing said closure element against said seat to normally close said spout; a control pin secured in said closure element and extending through and beyond said spout to a point where it is exposed for actuation by an animal such that angular movement thereof tilts the closure member and opens the valve; said valve having a by-pass passage formed therein providing communication between said inlet port and said spout around said closure member, and an adjusting screw threadably mounted in the valve with an end thereof extending into said passageway for selectively opening and closing the passageway and controlling the flow of water therethrough whereby a small continuous supply of water can pass through said spout when the valve is closed by said closure member.

2. The automatic device for the management of animals as claimed in claim 1 wherein said means for supplying drinking water includes a drinking nipple.

3. The automatic device for the management of animals as defined in claim 1 wherein said cage is generally rectangular and has ventilation openings formed therein only on two of its perpendicularly adjacent side walls, has dung discharge openings in its bottom wall and has openings in another of its side walls for said water and fodder supply means.

4. The automatic device for the management of animals as defined in claim 3 wherein the side walls of each of said cages have upper edges defining an open top for their respective cage, said edges being flanged outwardly; said frame including a plurality of pairs of spaced support elements and said cages being respectively positioned between said support elements and having their flanged edges removably positioned in supporting engagement therewith.

5. The automatic device as defined in claim 1 wherein a portion of the by-pass passageway and the end of the adjusting screw are both conically shaped to tightly mate with one another and form a seal.

6. The automatic device as defined in claim 5 wherein the valve body is made of stainless steel.

7. The automatic device as defined in claim 6 wherein said adjusting screw is made of plastic.

* * * * *